(12) United States Patent
Nakayama et al.

(10) Patent No.: US 11,739,853 B2
(45) Date of Patent: Aug. 29, 2023

(54) VENTILATION COMPONENT

(71) Applicant: NITTO DENKO CORPORATION, Ibaraki (JP)

(72) Inventors: Yusuke Nakayama, Osaka (JP); Youzou Yano, Osaka (JP); Tomoyuki Kasagi, Osaka (JP); Akira Miyagaki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/425,220

(22) PCT Filed: Jan. 24, 2020

(86) PCT No.: PCT/JP2020/002560
§ 371 (c)(1),
(2) Date: Jul. 22, 2021

(87) PCT Pub. No.: WO2020/158612
PCT Pub. Date: Aug. 6, 2020

(65) Prior Publication Data
US 2022/0120354 A1    Apr. 21, 2022

(30) Foreign Application Priority Data
Jan. 29, 2019    (JP) .................................. 2019-013267

(51) Int. Cl.
*F16K 15/14*    (2006.01)
*F16K 24/04*    (2006.01)
(52) U.S. Cl.
CPC ............ *F16K 15/148* (2013.01); *F16K 24/04* (2013.01)

(58) Field of Classification Search
CPC ............ Y10T 137/789; H01M 50/325; H01M 50/394; F16K 15/148; F16K 24/04; F16K 27/0209
See application file for complete search history.

(56) References Cited

U.S. PATENT DOCUMENTS 4,054,152 A    10/1977  Ito et al.
5,320,253 A *  6/1994  Robinson ............ A01M 7/0085
                                                222/481.5
(Continued)

FOREIGN PATENT DOCUMENTS

JP    S51135827 U1    11/1976
JP    H10299922       11/1998
(Continued)

OTHER PUBLICATIONS

International Search Report and Written Opinion issued for International Patent Application No. PCT/JP2020/002560, dated Apr. 7, 2020, 12 pages including English translation.

*Primary Examiner* — Hailey K. Do
(74) *Attorney, Agent, or Firm* — Hamre, Schumann, Mueller & Larson, P.C.

(57) ABSTRACT

A ventilation component includes a valve body portion, a shaft portion, a ventilation path, and a gas-permeable membrane. The shaft portion extends in a normal direction of the valve body portion. The shaft portion supports the valve body portion. The ventilation path extends through the shaft portion. The gas-permeable membrane closes the ventilation path. In a state where the ventilation component is fixed to a housing, a flow of gas passing through a peripheral opening is blocked by the valve body portion, and ventilation occurs between an inner space and an external space via the gas-permeable membrane. When a pressure difference obtained by subtracting a pressure of the external space from a pressure of the inner space is equal to or higher than a (Continued)

predetermined value, the valve body portion elastically deforms to be away from an outer surface to release the pressure of the inner space.

14 Claims, 11 Drawing Sheets

(56) References Cited

U.S. PATENT DOCUMENTS

| | | | | |
|---|---|---|---|---|
| 6,874,656 | B2* | 4/2005 | Rohr | B65D 51/165 222/481.5 |
| 2018/0292020 | A1* | 10/2018 | Kleinke | F16K 31/126 |
| 2020/0340592 | A1* | 10/2020 | Nakayama | F16K 15/148 |

FOREIGN PATENT DOCUMENTS

| | | | |
|---|---|---|---|
| JP | 2006266414 | 10/2006 | |
| WO | WO-2018199238 A1 * | 11/2018 | F16K 15/148 |

* cited by examiner

VENTILATION COMPONENT

TECHNICAL FIELD

The present invention relates to a ventilation component.

BACKGROUND ART

Valves called umbrella valves have been conventionally known.

For example, Patent Literature 1 describes a rubber umbrella valve constituting a check valve device. This umbrella valve is used for air pumps. In an air pump, the umbrella valve is attached so as to close a plurality of passage holes provided in a partition wall inside a housing. A check valve device is thus constituted.

CITATION LIST

Patent Literature

Patent Literature 1: JP 2006-266414 A

SUMMARY OF INVENTION

Technical Problem

The umbrella valve described in Patent Literature 1 is for constituting a check valve device in an air pump. According to the technique described in Patent Literature 1, it is impossible to cause ventilation while the umbrella valve is closed.

In view of such circumstances, the present invention provides a ventilation component with a pressure release valve in which ventilation can occur between an inner space and an external space of a housing even while a valve body portion is closed.

Solution to Problem

The present invention provides a ventilation component with a pressure release valve, the ventilation component including:

a valve body portion including an elastomer and having an umbrella cloth shape;

a shaft portion extending tubularly in a normal direction of the valve body portion and supporting the valve body portion;

a ventilation path extending through at least one of the shaft portion and the valve body portion in the normal direction of the valve body portion; and a gas-permeable membrane closing the ventilation path such that ventilation can occur and allowing gas to pass therethrough in a thickness direction thereof, wherein the ventilation component is used while being fixed to a housing having openings through which an inner space and an external space of the housing communicate with each other, the housing has, as the openings, a shaft portion-compatible opening having an inner diameter capable of insertion of the shaft portion and a peripheral opening positioned around the shaft portion-compatible opening, in a fixed state where the shaft portion is inserted into the shaft portion-compatible opening to fix the ventilation component to the housing, the valve body portion covers the peripheral opening and an outer circumferential portion of the valve body portion is in contact with an outer surface of the housing such that a flow of gas passing through the peripheral opening is blocked, and ventilation occurs between the inner space and the external space via the gas-permeable membrane, and in the fixed state, when a pressure difference obtained by subtracting a pressure of the external space of the housing from a pressure of the inner space of the housing is equal to or higher than a predetermined value, the valve body portion elastically deforms to be away from the outer surface to release the pressure of the inner space.

Also, the present invention provides a ventilation component with a pressure release valve, the ventilation component including:

an annular valve body portion including an elastomer and having an umbrella cloth shape, the annular valve body portion having a through hole at a center thereof in plan view;

a tubular holder including an elastomer and having a ventilation path extending therethrough in an axial direction thereof, and a gas-permeable membrane closing the ventilation path such that ventilation can occur and allowing gas to pass therethrough in a thickness direction thereof, wherein the ventilation component is used while being fixed to a housing having openings through which an inner space and an external space of the housing communicate with each other, the housing has, as the openings, a protruding opening defined by an edge of a protruding portion thereof and a peripheral opening positioned around the protruding opening, the protruding portion extending tubularly toward the external space of the housing and having an outer diameter capable of insertion into the through hole and the ventilation path, in a fixed state where the edge of the projecting portion is inserted into the through hole and then into the ventilation path to fix the ventilation component to the housing, the valve body portion covers the peripheral opening and an outer circumferential portion of the valve body portion is in contact with an outer surface of the housing such that a flow of gas passing through the peripheral opening is blocked, and ventilation occurs between the inner space and the external space via the gas-permeable membrane, and in the fixed state, when a pressure difference obtained by subtracting a pressure of the external space of the housing from a pressure of the inner space of the housing is equal to or higher than a predetermined value, the valve body portion elastically deforms to be away from the outer surface to release the pressure of the inner space.

Furthermore, the present invention provides a ventilation component with a pressure release valve, the ventilation component including:

a valve body portion including an elastomer and having an umbrella cloth shape;

a shaft portion extending tubularly in a normal direction of the valve body portion and supporting the valve body portion;

a ventilation path extending through the shaft portion in the normal direction of the valve body portion; and a gas-permeable membrane closing the ventilation path such that ventilation can occur and allowing gas to pass therethrough in a thickness direction thereof, wherein the ventilation component is used while being fixed to a housing having openings through which an inner space and an external space of the housing communicate with each other, the housing has, as the openings, a protruding opening defined by an edge of a protruding portion thereof and a peripheral opening positioned around the protruding opening, the protruding portion extending tubularly toward the external space of the housing and having an outer diameter capable of insertion into the ventilation path, in a fixed state where the edge of the projecting portion is inserted into the ventilation path to fix the ventilation component to the housing, the valve body portion covers the peripheral opening and an outer circumferential portion of the valve body portion is in contact with an outer surface of the housing such that a flow of gas passing through the peripheral opening is blocked, and ventilation occurs between the inner space and the external space via the gas-permeable membrane, and in the fixed state, when a pressure difference obtained by subtracting a pressure of the external space of the housing from a pressure of the inner space of the housing is equal to or higher than a predetermined value, the valve body portion elastically deforms to be away from the outer surface to release the pressure of the inner space.

Advantageous Effects of Invention

The above ventilation component allows ventilation between an inner space and an external space of a housing even while a valve body portion is closed.

DESCRIPTION OF EMBODIMENTS

Embodiments of the present invention will be described below with reference to the accompanying drawings. The following description are examples of the present invention, and the present invention is not limited to the following embodiments.

Figure 1A:
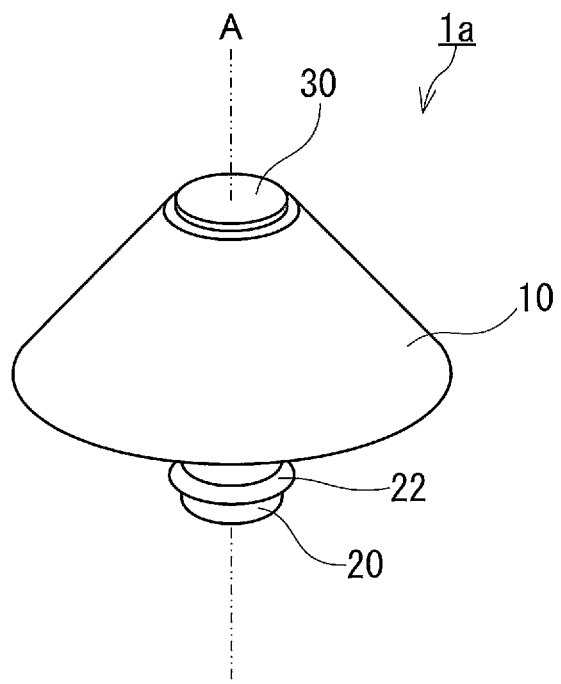
FIG. 1A is a perspective view showing an example of a ventilation component according to the present invention.
Figure 1B:
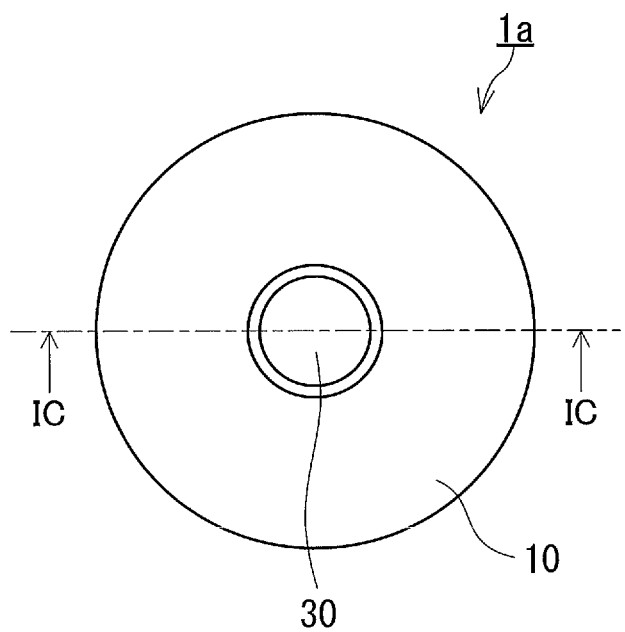
FIG. 1B is a plan view of the ventilation component shown in FIG. 1A.
Figure 1C:
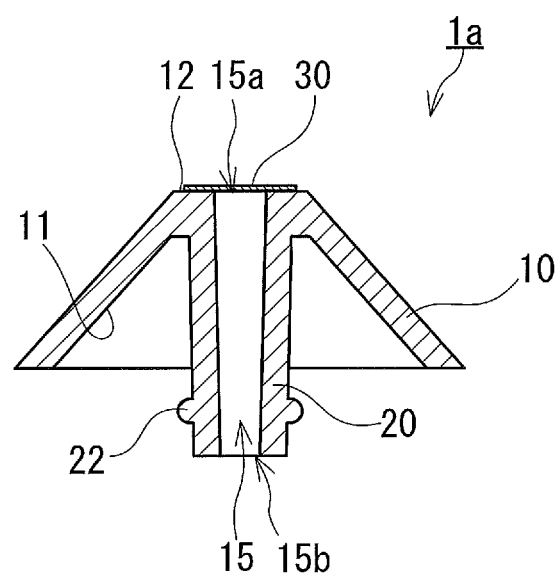
FIG. 1C is a cross-sectional view of the ventilation component taken along a line IC-IC in FIG. 1B.

As shown in FIG. 1A, FIG. 1B, and FIG. 1C, a ventilation component 1a includes a valve body portion 10, a shaft portion 20, a ventilation path 15, and a gas-permeable membrane 30. The ventilation component 1a is a ventilation component with a pressure release valve. The valve body portion 10 includes an elastomer, and has an umbrella cloth shape. The umbrella cloth shape means a shape like an umbrella cloth of an umbrella in an open state. Note that a dashed and double dotted line A in FIG. 1A indicates an axis of the valve body portion 10. The shaft portion 20 extends in a tubular or columnar manner in a normal direction of the valve body portion 10. The normal direction of the valve body portion 10 means a direction perpendicular to a curved surface or a plane of the valve body portion 10. The normal direction of the valve body portion 10 for example corresponds to a direction in which the axis of the valve body portion 10 extends. The shaft portion 20 supports the valve body portion 10. The ventilation path 15 extends through at least one of the valve body portion 10 and the shaft portion 20 in the normal direction of the valve body portion 10. As shown in FIG. 1C, the ventilation path 15 for example extends through the shaft portion 20. The gas-permeable membrane 30 closes the ventilation path 15 such that ventilation can occur. Gas can pass through the gas-permeable membrane 30 in a thickness direction of the gas-permeable membrane 30.

Figure 2A:
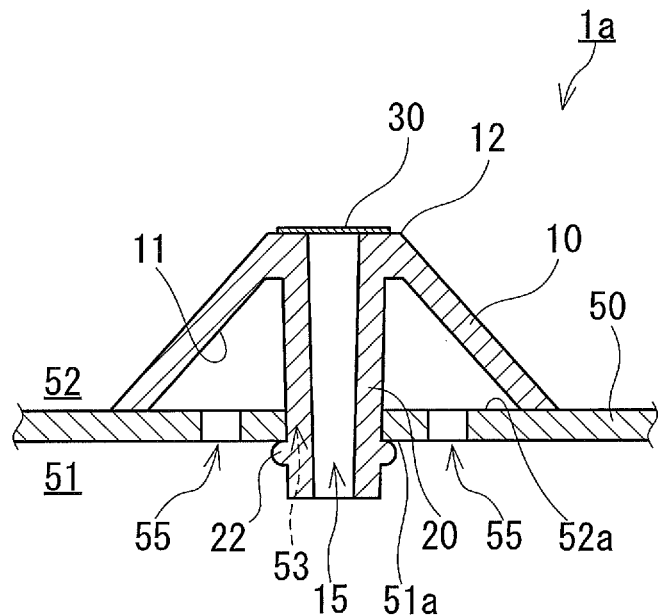
FIG. 2A is a cross-sectional view showing a closed state of a valve body portion of the ventilation component attached to a housing.
Figure 2B:
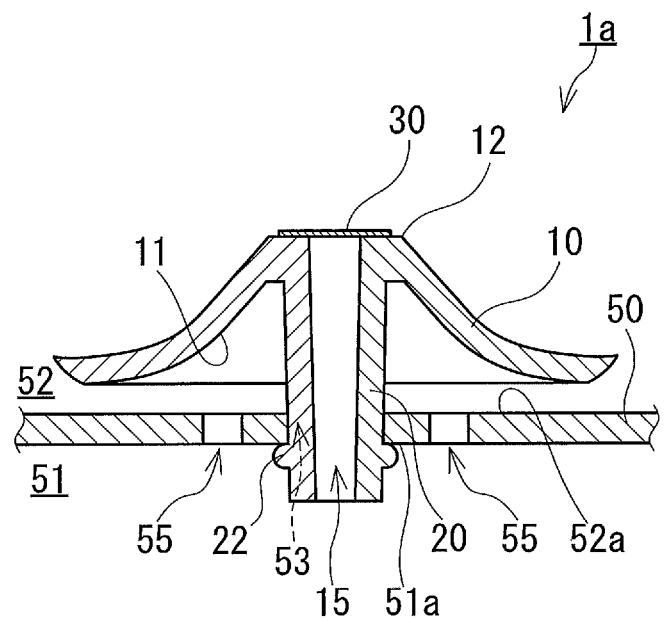
FIG. 2B is a cross-sectional view showing an open state of the valve body portion of the ventilation component attached to the housing.

As shown in FIG. 2A and FIG. 2B, the ventilation component 1a is used while being fixed to a housing 50. The housing 50 has openings through which an inner space 51 and an external space 52 communicate with each other. The housing 50 has, as such openings, a shaft portion-compatible opening 53 and a peripheral opening 55. The shaft portion-compatible opening 53 has an inner diameter capable of insertion of the shaft portion 20. The peripheral opening 55 is positioned around the shaft portion-compatible opening 53.

As shown in FIG. 2A and FIG. 2B, the shaft portion 20 is inserted into the shaft portion-compatible opening 53 to fix the ventilation component 1a to the housing 50. In a state where the ventilation component 1a is fixed to the housing 50 in this way (hereinafter, referred to as "fixed state A"), for example, as shown in FIG. 2A, the valve body portion 10 covers the peripheral opening 55 and an outer circumferential portion of the valve body portion 10 is in contact with an outer surface 52a of the housing 50 such that a flow of gas passing through the peripheral opening 55 is blocked. In addition, ventilation occurs between the inner space 51 and the external space 52 via the gas-permeable membrane 30. Meanwhile, as shown in FIG. 2B, in the fixed state A, when a pressure difference obtained by subtracting a pressure of the external space 52 of the housing 50 from a pressure of the inner space 51 of the housing 50 is equal to or higher than a predetermined value, the valve body portion 10 elastically deforms to be away from the outer surface 52a to release the pressure of the inner space 51. In other words, the ventilation component 1a in the fixed state A for example satisfies the following conditions in (i) and (ii).

(i) When the difference obtained by subtracting the pressure of the external space 52 of the housing 50 from the pressure of the inner space 51 of the housing 50 is lower than the predetermined value, the valve body portion 10 is closed while being in contact with the outer surface 52a of the housing 50 and covering the peripheral opening 55, and ventilation occurs between the inner space 51 and the external space 52 via the gas-permeable membrane 30.

(ii) When the difference obtained by subtracting the pressure of the external space 52 of the housing 50 from the pressure of the inner space 51 of the housing 50 is equal to or higher than the predetermined value, the valve body portion 10 elastically deforms to be away from the outer surface 52a to release the pressure of the inner space 51.

According to the ventilation component 1a, when the valve body portion 10 is closed in the fixed state A, ventilation occurs between the inner space 51 and the external space 52 via the ventilation path 15 and the gas-permeable membrane 30. The gas-permeable membrane 30 can prevent a foreign matter from entering the housing 50. In addition, when the difference obtained by subtracting the pressure of the external space 52 of the housing 50 from the pressure of the inner space 51 of the housing 50 equals or exceeds the predetermined value due to a rapid rise in internal pressure of the housing 50, the valve body portion 10 is opened to release the pressure of the inner space 51. This can prevent damages to the gas-permeable membrane 30. The ventilation component 1a has a simple structure, and thus manufacturing costs of the ventilation component 1a are low.

The valve body portion 10 for example has a facing surface 11 facing the outer surface 52a of the housing 50 in the fixed state A. As shown in FIG. 2A, when the valve body portion 10 is closed, the facing surface 11 is partially in contact with the outer surface 52a of the housing 50. The facing surface 11 extends to continue to a side surface of the shaft portion 20. When the valve body portion 10 is closed, the facing surface 11 and the side face of the shaft portion 20 form, outside the housing 50, a closed space communicating with the inner space 51 of the housing 50. In a space surrounded by the facing surface 11, the shaft portion 20 extends in the normal direction of the valve body portion 10. Owing to this, the shaft portion 20 extends from its connection portion with the valve body portion 10 toward the housing, thereby facilitating to fix the ventilation component 1a to the housing 50 by the shaft portion 20. Also, the ventilation component 1a has the simple structure.

The shaft portion 20 for example has an engagement portion 22. In the fixed state A, the engagement portion 22 is engaged with an inner surface 51a of the housing 50. The ventilation component 1a thus can be fixed to the housing 50. The engagement portion 22 can prevent the ventilation component 1a from moving away from the housing 50. For example, the housing 50 has an attachment hole for attaching the ventilation component 1a, and the shaft portion 20 is inserted into this attachment hole to fix the ventilation component 1a to the housing 50.

As shown in FIG. 1C, the ventilation path 15 for example has a first opening 15a. The first opening 15a is surrounded by a non-facing surface 12. The non-facing surface 12 is a surface of at least one of the valve body portion 10 and the shaft portion 20 that, when the ventilation component 1a is fixed to the housing 50, does not face the outer surface 52a of the housing 50. The gas-permeable membrane 30 is for example attached to the non-facing surface 12 so as to cover the first opening 15a. In this case, even when a foreign matter such as dust or water comes into contact with the gas-permeable membrane 30, the foreign matter is less likely to remain in the ventilation path 15. This easily maintains an excellent ventilation between the inner space 51 and the external space 52.

In the ventilation component 1a, the valve body portion 10 and the shaft portion 20 are for example formed integrally with each other. For example, the valve body portion 10 and the shaft portion 20 can be produced by integral molding. This easily increases the productivity of manufacturing the ventilation component 1a and easily reduces the manufacturing costs of the ventilation component 1a.

The ventilation component 1a may be formed by assembling a component constituting the valve body portion 10 and a component constituting the shaft portion 20. This case easily provides a variety of options of materials and structures of the valve body portion 10 and the shaft portion 20.

The elastomer included in the valve body portion 10 is not limited to any particular elastomer. The elastomer included in the valve body portion 10 is for example an elastomer such as a natural rubber, a synthetic rubber, or a thermoplastic elastomer. In this case, examples of the synthetic rubber include an isoprene rubber (IR), a butadiene rubber (BR), a chloroprene rubber (CR), a butyl rubber (IIR), a styrene butadiene rubber (SBR), a nitrile butadiene rubber (NBR), an ethylene propylene rubber (EPM, EPDM), an acrylic rubber (ACM, ANM), an epichlorohydrin rubber (CO, ECO), a silicone rubber (VMQ, FVMQ), a urethane rubber (AU, EU), and a fluorine rubber (FKM, FEPM).

The gas-permeable membrane 30 is not limited to any particular gas-permeable membrane as long as it has a desired ventilating property. The gas-permeable membrane 30 may be a single layer membrane, or may be a multilayer membrane. In the case where the gas-permeable membrane 30 is a multilayer membrane, each layer thereof can be one selected from the group consisting of a porous membrane, a nonwoven fabric, a cloth, and a mesh. The gas-permeable membrane 30 may include: a porous membrane and a nonwoven fabric; at least one of a cloth and a mesh, and a porous membrane; or a plurality of nonwoven fabrics. Typically, the gas-permeable membrane 30 is composed of an organic polymer material (resin). Examples of a material of the porous membrane include fluororesin. As the fluororesin, there can be used polytetrafluoroethylene (PTFE), polychlorotrifluoroethylene, a tetrafluoroethylene-hexafluoropropylene copolymer, or a tetrafluoroethylene-ethylene copolymer, for example. Examples of a material of each of the nonwoven fabric, the cloth, and the mesh include polyester such as polyethylene terephthalate, polyolefin such as polyethylene and polypropylene, nylon, aramid, and an ethylene-vinyl acetate copolymer.

The gas-permeable membrane 30 for example includes an extended PTFE porous membrane. In this case, the extended PTFE porous membrane may be layered on a gas-permeable supporting member such as a nonwoven fabric.

The gas-permeable membrane 30 may be subject to a liquid-repellant treatment as necessary. The liquid-repellant treatment is performed for example by forming, on the gas-permeable membrane 30, a liquid-repellant coating film containing a fluorine surface modifier having a perfluoroalkyl group. Formation of the liquid-repellant coating film is not limited to any particular formation method. The formation may be performed for example by coating a resin porous membrane with a solution or dispersion of a fluorine surface modifier having a perfluoroalkyl group with a method such as an air spray method, an electrostatic spray method, a clip coating method, a spin coating method, a roll coating method, a curtain flow coating method, or an impregnation method. Alternatively, the liquid-repellant coating film may be formed by an electrodeposition method or a plasma polymerization method.

The gas-permeable membrane 30 is for example adhered to at least one of the valve body portion 10 and the shaft portion 20. The gas-permeable membrane 30 may be welded to at least one of the valve body portion 10 and the shaft portion 20. Alternatively, the gas-permeable membrane 30 may be attached to at least one of the valve body portion 10 and the shaft portion 20 with a double-sided adhesive tape.

Figure 3A:
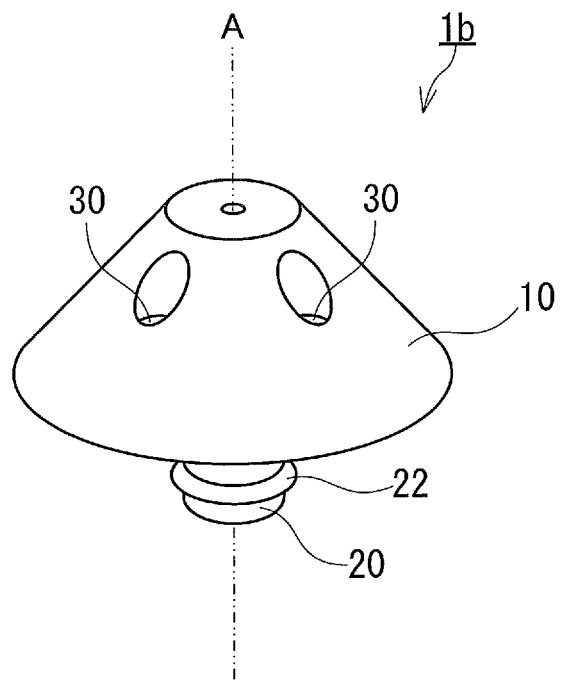
FIG. 3A is a perspective view showing another example of the ventilation component according to the present invention.

The ventilation component 1a can be modified from various perspectives. For example, the ventilation component 1a may be modified to a ventilation component 1b shown in FIG. 3A to FIG. 3C, a ventilation component 1c shown in FIG. 5A, a ventilation component 1c1 shown in FIG. 5B, a ventilation component 1e shown in FIG. 6, or ventilation components 1f to 1i shown respectively in FIG. 7A to FIG. 7D. The ventilation components 1b to 1i are each configured in the same manner as the ventilation component 1a except portions particularly otherwise described. Respective constituent elements of the ventilation components 1b to 1i that are identical to or correspond to those of the ventilation component 1a are indicated by the same reference numerals, and detailed descriptions thereof will be omitted. The description given for the ventilation component 1a is applicable to each of the ventilation components 1b to 1i unless there is a technical inconsistency.

Figure 3B:
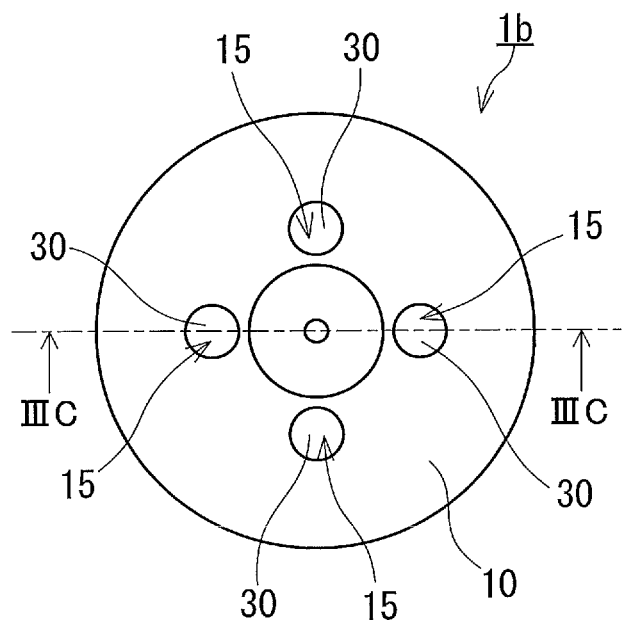
FIG. 3B is a plan view of the ventilation component shown in FIG. 3A.
Figure 3C:
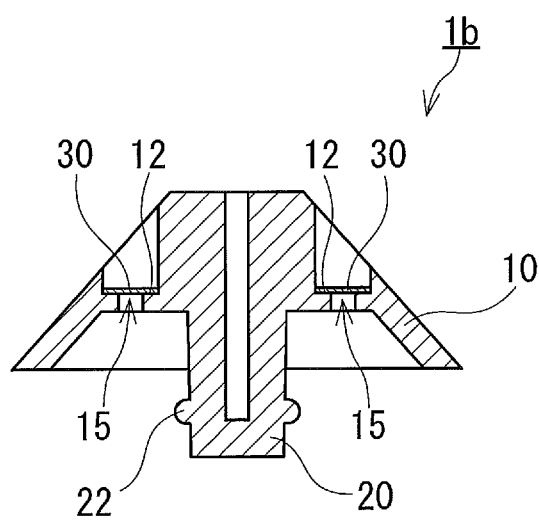
FIG. 3C is a cross-sectional view of the ventilation component taken along a line IIIC-IIIC in FIG. 3B.

As shown in FIG. 3C, in the ventilation component 1b, the ventilation path 15 extends through the valve body portion 10. The ventilation component 1b for example has the ventilation path 15 in plural (four in the example in the figure). As shown in FIG. 3B, the plurality of ventilation paths 15 are for example arranged away from each other at equal angles around an axis A of the valve body portion 10. In this way, in the case where the ventilation path 15 extends through the valve body portion 10, the ventilation path 15 is easily formed in plural in the ventilation component 1b.

For example, in the ventilation component 1b, the ventilation paths 15 each have a step forming the non-facing surface 12 inside it. The gas-permeable membrane 30 is attached to the non-facing surface 12 formed from this step.

Figure 4A:
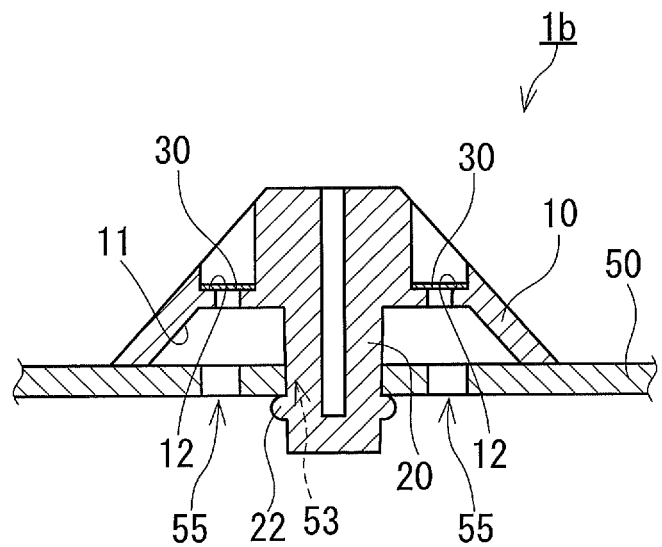
FIG. 4A is a cross-sectional view showing a closed state of a valve body portion of the ventilation component attached to a housing.
Figure 4B:
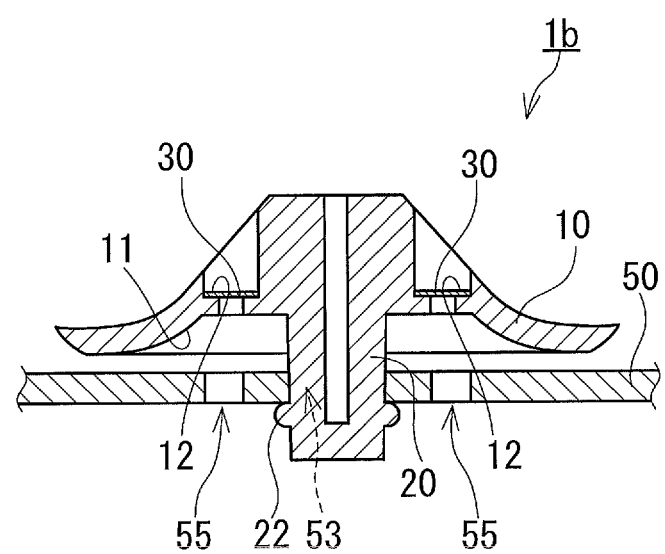
FIG. 4B is a cross-sectional view showing an open state of the valve body portion of the ventilation component attached to the housing.

As shown in FIG. 4A and FIG. 4B, the ventilation component 1b is opened and closed, in the same manner as the ventilation component 1a, in accordance with a magnitude of a difference obtained by subtracting a pressure of the external space 52 of the housing 50 from a pressure of the inner space 51 of the housing 50.

Figure 5A:
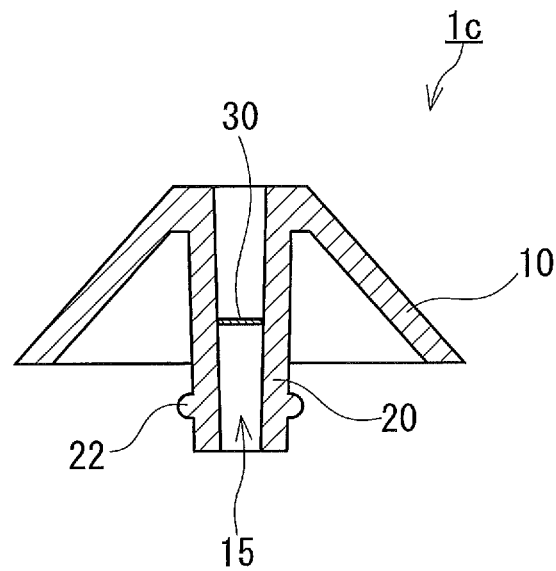
FIG. 5A is a cross-sectional view showing still another example of the ventilation component according to the present invention.

As shown in FIG. 5A, in the ventilation component 1c, the gas-permeable membrane 30 is for example disposed inside the ventilation path 15. In this case, when fixing the ventilation component 1c to the housing 50, an operator is less likely to touch the gas-permeable membrane 30.

Figure 5B:
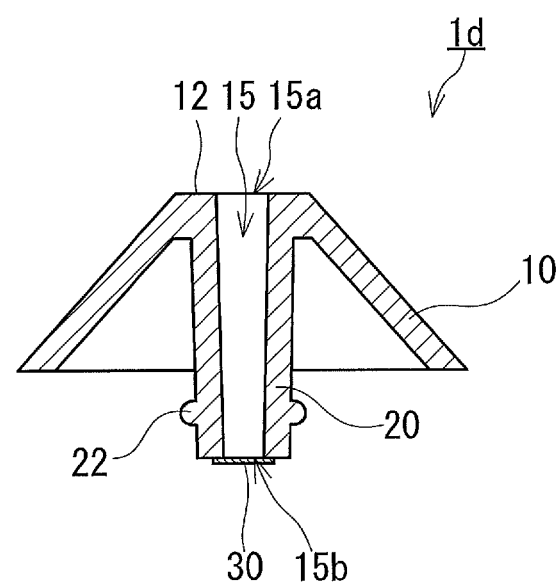
FIG. 5B is a cross-sectional view showing still another example of the ventilation component according to the present invention.

As shown in FIG. 5B, in the ventilation component 1d, the gas-permeable membrane 30 is attached so as to cover a second opening 15b. The second opening 15b is an opening of the ventilation path 15 that is formed in a position more distant from the non-facing surface 12 than the first opening 15a is in the normal direction of the valve body portion 10. In this case, the gas-permeable membrane 30 is less likely to be exposed in the external space 52 of the housing 50.

Figure 6:
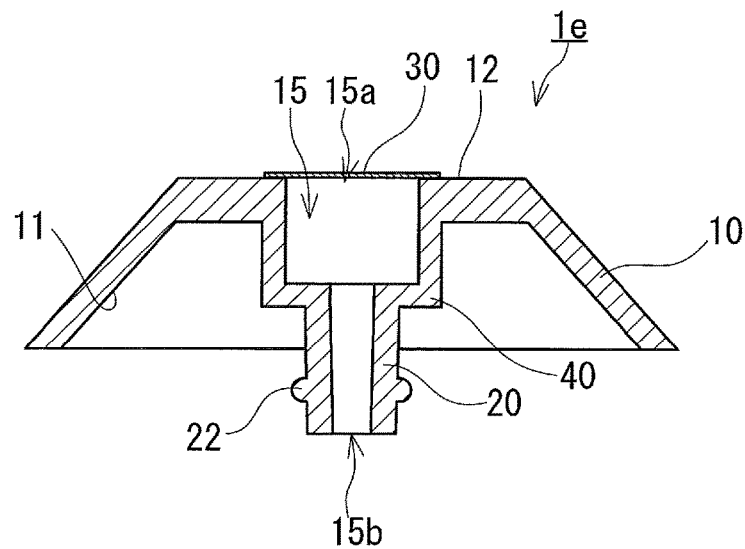
FIG. 6 is a cross-sectional view showing still another example of the ventilation component according to the present invention.

As shown in FIG. 6, in the ventilation component 1e, the ventilation path 15 has the first opening 15a and the second opening 15b. The first opening 15a is surrounded by the non-facing surface 12 that, when the ventilation component 1e is fixed to the housing 50, does not face the outer surface 52a of the housing 50 in at least one of the valve body portion 10 and the shaft portion 20. The second opening 15b is formed in a position more distant from the non-facing surface 12 than the first opening 15a is in the normal direction of the valve body portion 10. In the ventilation component 1e, the first opening 15a has a larger opening area than the second opening 15b. This easily increases a ventilation amount in ventilation with use of the gas-permeable membrane 30.

In the ventilation component 1e, the gas-permeable membrane 30 is for example attached to the non-facing surface 12 so as to cover the first opening 15a.

In the ventilation component 1e, the valve body portion 10 has the facing surface 11 that, when the ventilation component 1e is fixed to the housing 50, faces the outer surface 52a of the housing 50. The shaft portion 20 for example has a pressing portion 40. When the non-facing surface 12 is pressed toward the facing surface 11 while the ventilation component 1e is fixed to the housing 50, the pressing portion 40 can come into contact with the housing 50. For example, it is conceivable that the ventilation component 1e is produced by inserting a component of the ventilation component 1e including the valve body portion 10 and the shaft portion 20 into the attachment hole of the housing 50, and then press-bonding the gas-permeable membrane 30 to this component. In this case, in press-bonding of the gas-permeable membrane 30, the pressing portion 40 comes into contact with the housing 50 to restrict movement of the component of the ventilation component 1e, thereby appropriately press-bonding the gas-permeable membrane 30. This easily increases the productivity of manufacturing the ventilation component 1e.

Figure 7A:
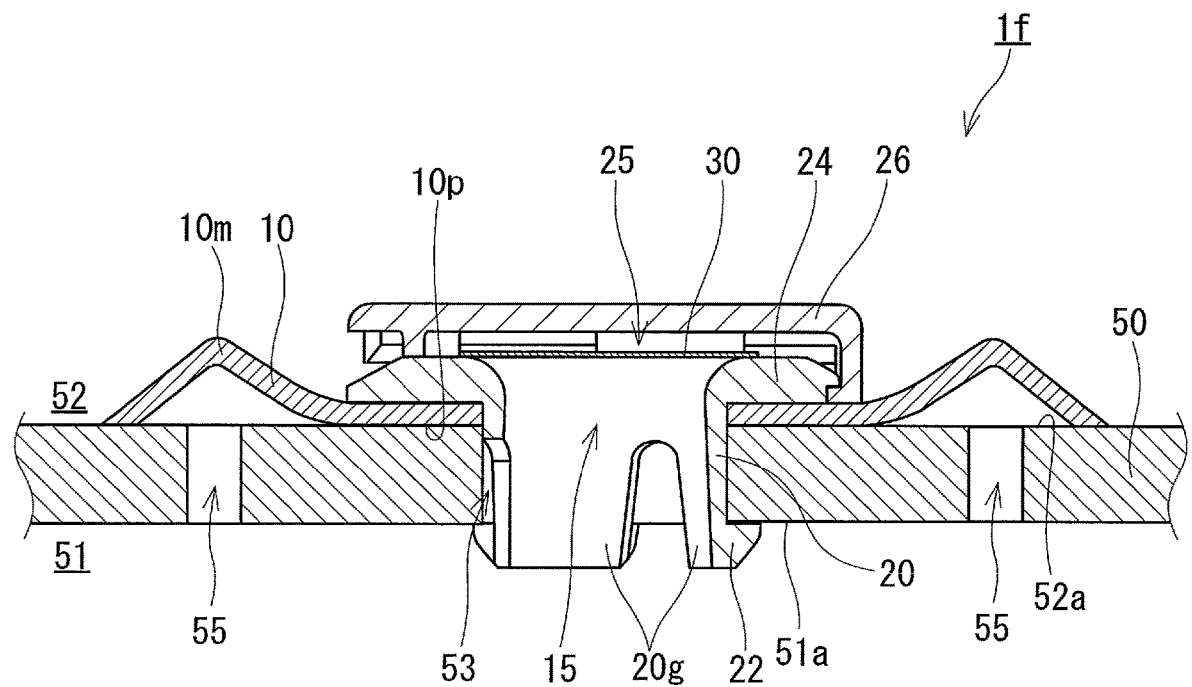
FIG. 7A is a cross-sectional view showing still another example of the ventilation component according to the present invention.

As shown in FIG. 7A, the ventilation component 1f for example further includes a flange 24. The flange 24 covers the valve body portion 10 around the shaft portion 20 when the ventilation component 1f is viewed in plan toward the outer surface 52a of the housing 50 along the normal direction of the valve body portion 10, and the flange 24 perpendicularly intersects the shaft portion 20. The ventilation path 15 extends through the flange 24 and the shaft portion 20.

The ventilation component 1f is formed by assembling the valve body portion 10 and the shaft portion 20. In other words, the ventilation component 1f is formed by assembling a component constituting the valve body portion 10 and a component constituting the shaft portion 20. This easily provides a variety of options of materials and structures of the valve body portion 10 and the shaft portion 20.

In the ventilation component 1f, the shaft portion 20 and the flange 24 are for example formed integrally with each other. Thus, the ventilation component 1f is for example formed by assembling the valve body portion 10 and a component including the shaft portion 20 and the flange 24. Note that the shaft portion 20 and the flange 24 may be formed by separate components and these components may be assembled.

As shown in FIG. 7A, the valve body portion 10 has a plane 10p in contact with the outer surface 52a of the housing 50 around the shaft portion 20 in the fixed state A. In the fixed state A, the flange 24 and the outer surface 52a of the housing 50 sandwich therebetween the plane 10p of the valve body portion 10. Thus, the valve body portion 10 is firmly fixed by the flange 24 and the outer surface 52a.

In the ventilation component 1f, the valve body portion 10 for example has an annular pleat 10m. In the fixed state A, the pleat 10m is for example positioned directly above the peripheral opening 55. With such a structure, it is easy to reduce a risk that, in the fixed state A, the outer circumferential portion of the valve body portion 10 accidentally moves away from the outer surface 52a of the housing 50 thus to cause entering of a foreign matter through the peripheral opening 55.

The ventilation component 1f for example further includes a cover 26. The cover 26 covers the gas-permeable membrane 30 and forms a space 25 communicating with an outside of the ventilation component 1f between the cover 26 and the gas-permeable membrane 30. The cover 26 can protect the gas-permeable membrane 30. In addition, ventilation occurs between the inner space 51 and the external space 52 by gas passing through the ventilation path 15 and the space 25.

As shown in FIG. 7A, the shaft portion 20 for example has a plurality of leg portions 20g. The plurality of leg portions 20g are arranged away from each other around a central axis of the shaft portion 20 by slits extending from a tip of the shaft portion 20 along the central axis of the shaft portion 20. The plurality of leg portions 20g have respective engagement portions 22 formed on tip portions thereof. The engagement portions 22 protrude outward in a direction perpendicular to the central axis of the shaft portion 20. With such a structure, in attachment of the ventilation component if to the housing 50 including insertion of the shaft portion 20 into the shaft portion-compatible opening 53, when the tip portions of the shaft portions 20 come into contact with an edge 2 of the shaft portion-compatible opening 53, the leg portions 20g elastically deform inward. Subsequently, when the engagement portions 22 pass through the shaft portion-compatible opening 53, the deformation of the leg portions 20g disappears, and the engagement portions 22 for example come into contact with the inner surface 51a of the housing 50. In this way, the engagement portions 22 engage with the housing 50 by snap-fitting and thus the ventilation component if is attached to the housing 50.

As shown in FIG. 7A, the gas-permeable membrane 30 is for example adhered to the flange 24. The gas-permeable membrane 30 may be welded to the flange 24, or may be attached to the flange 24 with a double-sided adhesive tape.

Figure 7B:
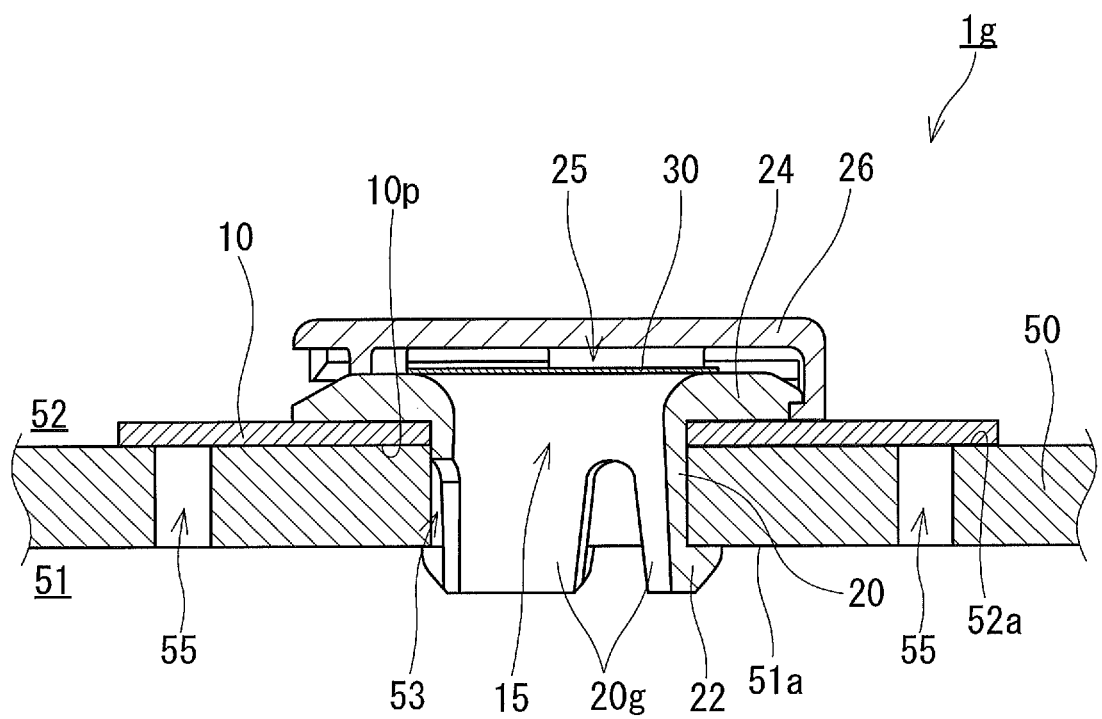
FIG. 7B is a cross-sectional view showing still another example of the ventilation component according to the present invention.
Figure 7C:
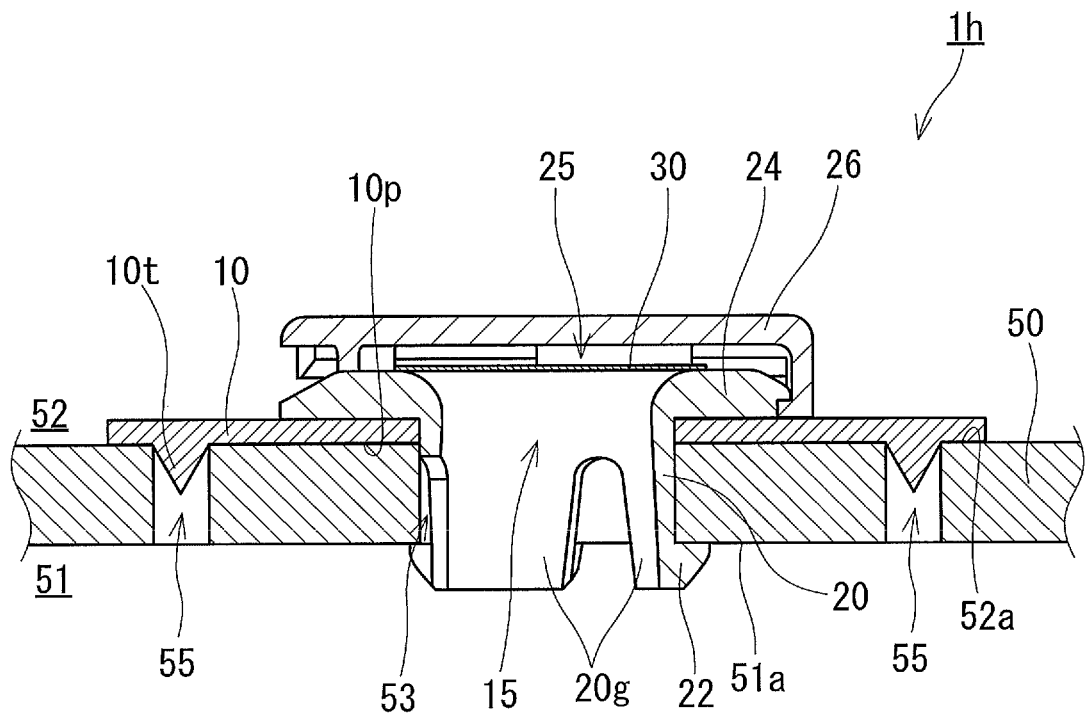
FIG. 7C is a cross-sectional view showing still another example of the ventilation component according to the present invention.
Figure 7D:
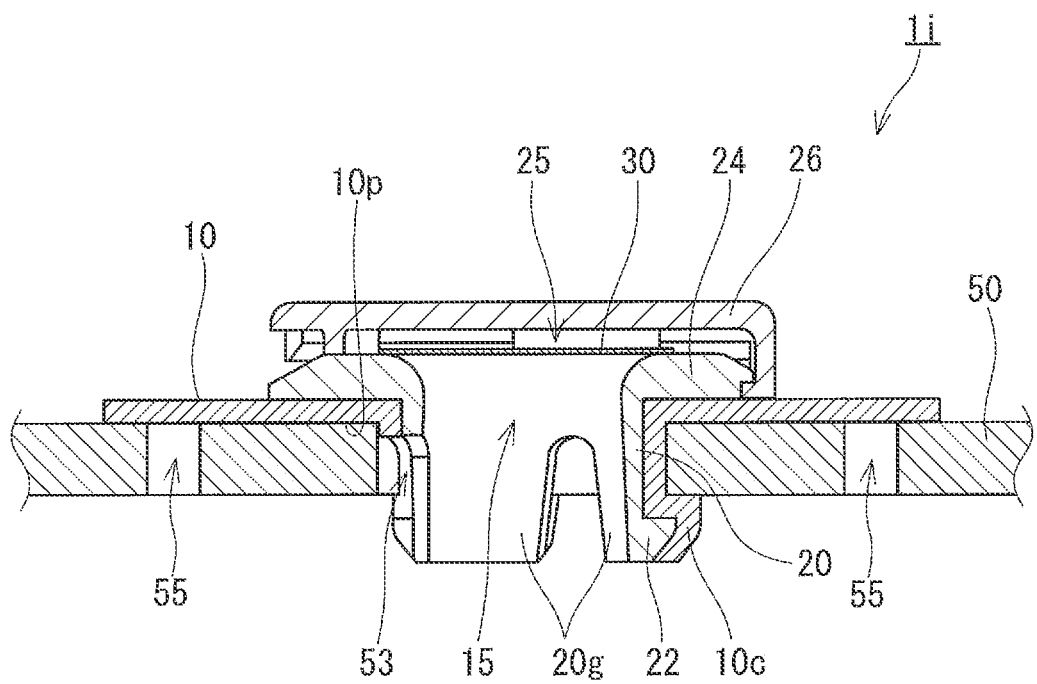
FIG. 7D is a cross-sectional view showing still another example of the ventilation component according to the present invention.

The ventilation component 1g shown in FIG. 7B, the ventilation component 1h shown in FIG. 7C, and the ventilation component 1i shown in FIG. 7D are each configured in the same manner as the ventilation component 1f except portions particularly otherwise described. Respective constituent elements of the ventilation components 1g to 1i that are identical to or correspond to those of the ventilation component 1f are indicated by the same reference numerals, and detailed descriptions thereof will be omitted. The description given for the ventilation component 1f is applicable to each of the ventilation components 1g to 1i unless there is a technical inconsistency.

As shown in FIG. 7B, in the ventilation component 1g, the valve body portion 10 is an annular sheet. In the ventilation component 1g in the fixed state A, one of principal surfaces of the valve body portion 10 extends along the outer surface 52a of the housing 50. Typically, the one principal surface of the valve body portion 10 is in contact with the outer surface 52a of the housing 50. With such a structure, it is possible to prevent damages to the gas-permeable membrane 30 due to a rapid rise in internal pressure of the housing 50 while simplifying a structure of the valve body portion 10.

As shown in FIG. 7C, in the ventilation component 1h, the valve body portion 10 is an annular sheet. The valve body portion 10 has a projection 10t. In the fixed state A, the projection 10t is accommodated inside the peripheral opening 55. With such a structure, it is possible to further reduce a risk that a foreign matter enters the inner space 51 of the housing 50 through the peripheral opening 55.

As shown in FIG. 7D, in the ventilation component 1i, the valve body portion 10 has a covering portion 10c covering an outer circumferential surface of the shaft portion 20. The covering portion 10c covers for example the engagement portions 22. With such a structure, the valve body portion 10 can protect the outer circumferential surface of the shaft portion 20.

Figure 8:
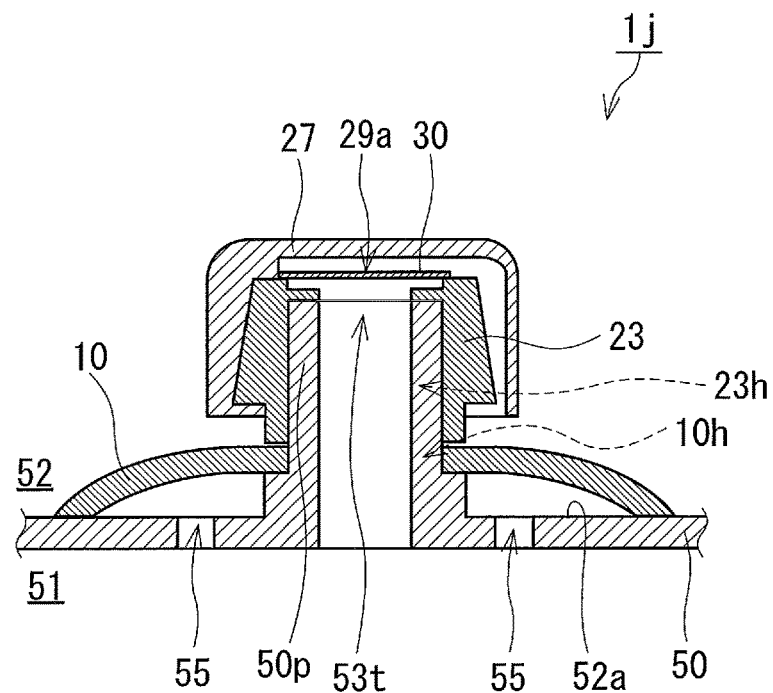
FIG. 8 is a cross-sectional view showing still another example of the ventilation component according to the present invention.

A ventilation component 1j shown in FIG. 8 can be also provided. The ventilation component 1j can be configured in the same manner as the ventilation component 1a except portions particularly otherwise described. Constituent elements of the ventilation component 1j that are identical to or correspond to those of the ventilation component 1a are indicated by the same reference numerals, and detailed descriptions thereof will be omitted. The description given for the ventilation component 1a is applicable to the ventilation component 1j unless there is a technical inconsistency.

The ventilation component 1j is a ventilation component with a pressure release valve. The ventilation component 1j includes an annular valve body portion 10, a tubular holder 23, and a gas-permeable membrane 30. The valve body portion 10 includes an elastomer, and has an umbrella cloth shape. The valve body portion 10 has a through hole 10h at a center thereof in plan view. The holder 23 includes an elastomer, and has a ventilation path 23h extending therethrough in an axial direction thereof. The gas-permeable membrane 30 is a membrane that closes the ventilation path 23h such that ventilation can occur, and allows gas to pass therethrough in a thickness direction thereof.

The ventilation component 1j is for example used while being fixed to a housing 50. The housing 50 has openings through which an inner space 51 and an external space 52 communicate with each other. The housing 50 has, as such openings, a protruding opening 53t and a peripheral opening 55. The protruding opening 53t is defined by an edge of a projecting portion 50p. The projecting portion 50p protrudes tubularly toward the external space 52 of the housing 50, and has an outer diameter capable of insertion into the through hole 10h and the ventilation path 23h.

As shown in FIG. 8, the edge of the projecting portion 50p is inserted into the through hole 10h and then into the ventilation path 23h to fix the ventilation component 1j to the housing 50. In a state where the ventilation component 1j is fixed to the housing 50 in this way (hereinafter, referred to as "fixed state B"), for example, as shown in FIG. 8, the valve body portion 10 covers the peripheral opening 55 and an outer circumferential portion of the valve body portion 10 is in contact with an outer surface 52a of the housing 50 such that a flow of gas passing through the peripheral opening 55 is blocked. In addition, ventilation occurs between the inner space 51 and the external space 52 via the gas-permeable membrane 30. Meanwhile, in the fixed state B, when a pressure difference obtained by subtracting a pressure of the external space 52 of the housing 50 from a pressure of the inner space 51 of the housing 50 is equal to or higher than a predetermined value, the valve body portion 10 elastically deforms to be away from the outer surface 52a to release the pressure of the inner space 51. This can prevent damages to the gas-permeable membrane 30.

Typically, in the fixed state B, an inner circumferential surface of the holder 23 is in contact with an outer circumferential surface of the projecting portion 50p. In addition, in the fixed state B, an edge of the through hole 10h is in contact with the outer circumferential surface of the projecting portion 50p.

The elastomer included in the holder 23 is not limited to any particular elastomer. Examples of the elastomer included in the holder 23 include the elastomers exemplified as those included in the valve body portion 10.

As shown in FIG. 8, the gas-permeable membrane 30 is for example adhered to the holder 23. The gas-permeable membrane 30 may be welded to the holder 23, or may be attached to the holder 23 with a double-sided adhesive tape.

The ventilation component 1j is formed for example by assembling the valve body portion 10 and the holder 23. In other words, the ventilation component 1j is formed by assembling a component constituting the valve body portion 10 and a component constituting the holder 23. This easily provides a variety of options of materials and structures of the valve body portion 10 and the holder 23.

As shown in FIG. 8, the ventilation component 1j further includes a bottomed and tubular cover 27. The cover 27 has an inner diameter capable of insertion of the holder 23. When the holder 23 is inserted into the cover 27, the cover 27 covers the gas-permeable membrane 30 and forms a space 29a communicating with an outside of the ventilation component 1j between the cover 27 and the gas-permeable membrane 30. With such a structure, the cover 27 can protect the gas-permeable membrane 30. In addition, ventilation occurs between the inner space 51 and the external space 52 by gas passing through the space 29a.

When the holder 23 is inserted into the cover 27, part of an inner surface of a side wall of the cover 27 is in contact with an outer circumferential surface of the holder 23. Meanwhile, another part of the inner surface of the side wall of the cover 27 is away from the outer circumferential surface of the holder 23. Thus, the holder 23 is fixed inside the cover 27 and the space 29a communicates with the outside of the ventilation component 1j.

The cover 27 has an opening at an end portion thereof opposite to a bottom portion thereof. At least part of an edge of the opening of the cover 27 protrudes toward an axis of the cover 27. Thus, for example, when the holder 23 is inserted into the cover 27, the at least part of the edge of the opening of the cover 27 is engaged with the outer circumferential surface of the holder 23. This allows the cover 27 to be attached to the holder 23 in a desired state.

Figure 9:
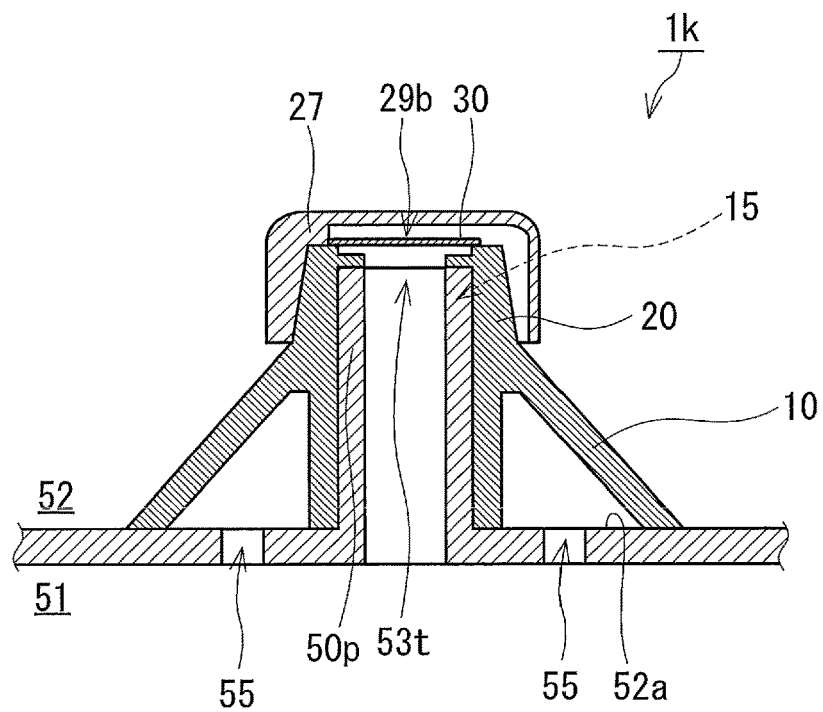
FIG. 9 is a cross-sectional view showing still another example of the ventilation component according to the present invention.

A ventilation component 1k shown in FIG. 9 can be also provided. The ventilation component 1k can be configured in the same manner as the ventilation component 1a except portions particularly otherwise described. Constituent elements of the ventilation component 1k that are identical to or correspond to those of the ventilation component 1a are indicated by the same reference numerals, and detailed descriptions thereof will be omitted. The description given for the ventilation component 1a is applicable to the ventilation component 1k unless there is a technical inconsistency.

The ventilation component 1k is a ventilation component with a pressure release valve. The ventilation component 1k includes a valve body portion 10 having an umbrella cloth shape, a shaft portion 20, a ventilation path 15, and a gas-permeable membrane 30. The valve body portion 10 includes an elastomer. The shaft portion 20 includes an elastomer, and extends tubularly in a normal direction of the valve body portion 10. In addition, the shaft portion 20 supports the valve body portion 10. The ventilation path 15 extends through the shaft portion 20 in the normal direction of the valve body portion 10. The gas-permeable membrane 30 is a membrane that closes the ventilation path 15 such that ventilation can occur, and allows gas to pass in a thickness direction thereof.

The ventilation component 1k is for example used while being fixed to a housing 50. The housing 50 has openings through which an inner space 51 and an external space 52 communicate with each other. The housing 50 has, as such openings, a protruding opening 53t and a peripheral opening 55. The protruding opening 53t is defined by an edge of a projecting portion 50p. The projecting portion 50p protrudes tubularly toward the external space 52 of the housing 50, and has an outer diameter capable of insertion into the ventilation path 15.

As shown in FIG. 9, the edge of the projecting portion 50p is inserted into the ventilation path 15 to fix the ventilation component 1k to the housing 50. In a state where the ventilation component 1k is fixed to the housing 50 in this way (hereinafter, referred to as "fixed state C"), for example, as shown in FIG. 9, the valve body portion 10 covers the peripheral opening 55 and an outer circumferential portion of the valve body portion 10 is in contact with an outer surface 52a of the housing 50 such that a flow of gas passing through the peripheral opening 55 is blocked. In addition, ventilation occurs between the inner space 51 and the external space 52 via the gas-permeable membrane 30. Meanwhile, in the fixed state C, when a pressure difference obtained by subtracting a pressure of the external space 52 of the housing 50 from a pressure of the inner space 51 of the housing 50 is equal to or higher than a predetermined value, the valve body portion 10 elastically deforms to be away from the outer surface 52a to release the pressure of the inner space 51. This can prevent damages to the gas-permeable membrane 30.

Typically, in the fixed state C, an inner circumferential surface of the shaft portion 20 is in contact with an outer circumferential surface of the projecting portion 50p.

The elastomer included in the shaft portion 20 is not limited to any particular elastomer. Examples of the elastomer included in the shaft portion 20 include the elastomers exemplified as those included in the valve body portion 10.

As shown in FIG. 9, the gas-permeable membrane 30 is for example adhered to the shaft portion 20. The gas-permeable membrane 30 may be welded to the shaft portion 20, or may be attached to the shaft portion 20 with a double-sided adhesive tape.

In the ventilation component 1k, the valve body portion 10 and the shaft portion 20 are formed integrally with each other. For example, the valve body portion 10 and the shaft portion 20 can be produced by integral molding. This easily increases the productivity of manufacturing the ventilation component 1k and easily reduces manufacturing costs of the ventilation component 1k. The ventilation component 1a may be formed by assembling a component constituting the valve body portion 10 and a component constituting the shaft portion 20. This case easily provides a variety of options of materials and structures of the valve body portion 10 and the shaft portion 20.

As shown in FIG. 9, the ventilation component 1k further includes a bottomed and tubular cover 27. The cover 27 has an inner diameter capable of insertion of the shaft portion 20. When the shaft portion 20 is inserted into the cover 27, the cover 27 covers the gas-permeable membrane 30 and forms a space 29b communicating with an outside of the ventilation component 1k between the cover 27 and the gas-permeable membrane 30. With such a structure, the cover 27 can protect the gas-permeable membrane 30. In addition, ventilation occurs between the inner space 51 and the external space 52 by gas passing through the space 29b.

When the shaft portion 20 is inserted into the cover 27, part of an inner surface of a side wall of the cover 27 is in contact with an outer circumferential surface of the shaft portion 20. Meanwhile, another part of the inner surface of the side wall of the cover 27 is away from the outer circumferential surface of the shaft portion 20. Thus, the shaft portion 20 is fixed inside the cover 27 and the space 29b to communicates with the outside of the ventilation component 1k.

The invention claimed is:

1. A ventilation component with a pressure release valve, the ventilation component comprising:
    a valve body portion including an elastomer and having an umbrella cloth shape;
    a shaft portion extending tubularly in a normal direction of the valve body portion and supporting the valve body portion;
    a ventilation path extending through at least one of the shaft portion and the valve body portion in the normal direction of the valve body portion; and
    a gas-permeable membrane closing the ventilation path such that ventilation can occur and allowing gas to pass therethrough in a thickness direction thereof, wherein
    the ventilation component is used while being fixed to a housing having openings through which an inner space and an external space of the housing communicate with each other,
    the housing has, as the openings, a shaft portion-compatible opening having an inner diameter capable of insertion of the shaft portion and a peripheral opening positioned around the shaft portion-compatible opening,
    in a fixed state where the shaft portion is inserted into the shaft portion-compatible opening to fix the ventilation component to the housing, the valve body portion covers the peripheral opening and an outer circumferential portion of the valve body portion is in contact with an outer surface of the housing such that a flow of gas passing through the peripheral opening is blocked, and ventilation occurs between the inner space and the external space via the gas-permeable membrane,
    in the fixed state, when a pressure difference obtained by subtracting a pressure of the external space of the housing from a pressure of the inner space of the housing is equal to or higher than a predetermined value, the valve body portion elastically deforms to be away from the outer surface to release the pressure of the inner space, and
    the ventilation component satisfies the following condition (I) or (II):
    (I) the valve body portion and the shaft portion are formed integrally with each other;
    (II) the ventilation component is capable of being fixed to the housing in which the shaft portion-compatible opening and the peripheral opening are formed on the same plane, and the valve body portion has a constant thickness between both ends of a flange that covers the valve body portion around the shaft portion in a direction perpendicular to the shaft portion.

2. The ventilation component according to claim 1, wherein the ventilation component is formed by assembling the valve body portion and the shaft portion or by assembling the valve body portion and a component including the shaft portion and the flange.

3. The ventilation component according to claim 1, wherein
    the shaft portion has an engagement portion that is engaged with an inner surface of the housing in the fixed state.

4. The ventilation component according to claim 1, further comprising:
    a cover covering the gas-permeable membrane and forming a space communicating with an outside of the ventilation component between the cover and the gas-permeable membrane.

5. The ventilation component according to claim 1, further comprising
    a flange covering the valve body portion around the shaft portion when the ventilation component is viewed in plan toward the outer surface of the housing along the normal direction of the valve body portion and perpendicularly intersecting the shaft portion, wherein
    the ventilation path extends through the flange and the shaft portion.

6. The ventilation component according to claim 5, wherein
    the valve body portion has a plane in contact with the outer surface of the housing around the shaft portion in the fixed state, and
    in the fixed state, the flange and the outer surface of the housing sandwich therebetween the plane of the valve body portion.

7. A ventilation component with a pressure release valve, the ventilation component comprising:
    an annular valve body portion including an elastomer and having an umbrella cloth shape, the annular valve body portion having a through hole at a center thereof in plan view;
    a tubular holder including an elastomer and having a ventilation path extending therethrough in an axial direction thereof; and
    a gas-permeable membrane closing the ventilation path such that ventilation can occur and allowing gas to pass therethrough in a thickness direction thereof, wherein
    the ventilation component is configured to be used while being fixed to a housing having openings through which an inner space and an external space of the housing communicate with each other, the housing having, as the openings, a protruding opening defined by an edge of a protruding portion thereof and a peripheral opening positioned around the protruding opening, the protruding portion extending tubularly toward the external space of the housing and having an outer diameter capable of insertion into the through hole and the ventilation path, wherein
    in a fixed state where the edge of the projecting portion is inserted into the through hole and then into the ventilation path to fix the ventilation component to the housing, the valve body portion covers the peripheral opening and an outer circumferential portion of the valve body portion is in contact with an outer surface of the housing such that a flow of gas passing through the peripheral opening is blocked, and ventilation occurs between the inner space and the external space via the gas-permeable membrane, in the fixed state, when a pressure difference obtained by subtracting a pressure of the external space of the housing from a pressure of the inner space of the housing is equal to or higher than a predetermined value, the valve body portion elastically deforms to be away from the outer surface to release the pressure of the inner space, and the ventilation component satisfies at least one selected from the group consisting of the following conditions (i) and (ii):

(i) the gas-permeable membrane is adhered directly to the tubular holder; and (ii) the ventilation component comprises a cover having an inner surface comprising a first part being in contact with an outer surface of the tubular holder and a second part being away from the outer surface of the tubular holder.

8. The ventilation component according to claim 7, wherein the cover is a bottomed and tubular cover having an inner diameter capable of insertion of the holder, and when the holder is inserted into the cover, the cover covers the gas-permeable membrane and forms, between the cover and the gas-permeable membrane, a space communicating with an outside of the ventilation component.

9. The ventilation component according to claim 7, wherein the ventilation component is formed by assembling the valve body portion and the holder.

10. The ventilation component according to claim 7, wherein the condition (ii) is satisfied, and the second part of the cover and the outer surface of the tubular holder define an opening in communication with an outside of the ventilation component.

11. A ventilation component with a pressure release valve, the ventilation component comprising:

a valve body portion including an elastomer and having an umbrella cloth shape;

a shaft portion extending tubularly in a normal direction of the valve body portion and supporting the valve body portion;

a ventilation path extending through the shaft portion in the normal direction of the valve body portion; and a gas-permeable membrane closing the ventilation path such that ventilation can occur and allowing gas to pass therethrough in a thickness direction thereof, wherein the ventilation component is configured to be used while being fixed to a housing having openings through which an inner space and an external space of the housing communicate with each other, the housing having, as the openings, a protruding opening defined by an edge of a protruding portion thereof and a peripheral opening positioned around the protruding opening, the protruding portion extending tubularly toward the external space of the housing and having an outer diameter capable of insertion into the ventilation path, wherein in a fixed state where the edge of the projecting portion is inserted into the ventilation path to fix the ventilation component to the housing, the valve body portion covers the peripheral opening and an outer circumferential portion of the valve body portion is in contact with an outer surface of the housing such that a flow of gas passing through the peripheral opening is blocked, and ventilation occurs between the inner space and the external space via the gas-permeable membrane, in the fixed state, when a pressure difference obtained by subtracting a pressure of the external space of the housing from a pressure of the inner space of the housing is equal to or higher than a predetermined value, the valve body portion elastically deforms to be away from the outer surface to release the pressure of the inner space, and the ventilation component satisfies at least one selected from the group consisting of the following conditions (i) and (ii):

(i) the gas-permeable membrane is adhered directly to the shaft portion; and (ii) the ventilation component comprises a cover having an inner surface comprising a first part being in contact with an outer surface of the shaft portion and a second part being away from the outer surface of the shaft portion.

12. The ventilation component according to claim 11, wherein the cover is a bottomed and tubular cover having an inner diameter capable of insertion of the shaft portion, and when the shaft portion is inserted into the cover, the cover covers the gas-permeable membrane and forms, between the cover and the gas-permeable membrane, a space communicating with an outside of the ventilation component.

13. The ventilation component according to claim 11, wherein the valve body portion and the shaft portion are formed integrally with each other.

14. The ventilation component according to claim 11, wherein the condition (ii) is satisfied, and the second part of the cover and the outer surface of the shaft portion define an opening in communication with an outside of the ventilation component.

* * * * *